(12) United States Patent
Wilkinson et al.

(10) Patent No.: US 7,657,494 B2
(45) Date of Patent: Feb. 2, 2010

(54) METHOD FOR FORECASTING THE PRODUCTION OF A PETROLEUM RESERVOIR UTILIZING GENETIC PROGRAMMING

(75) Inventors: David A. Wilkinson, Concord, CA (US); Tina Yu, St. John's NL (CA); Alexandre Castellini, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 204 days.

(21) Appl. No.: 11/533,550

(22) Filed: Sep. 20, 2006

(65) Prior Publication Data

US 2008/0082469 A1  Apr. 3, 2008

(51) Int. Cl.
*G06N 3/00* (2006.01)
*G06N 3/12* (2006.01)
(52) U.S. Cl. .............................. 706/13; 702/13; 703/10
(58) Field of Classification Search ........................ None
See application file for complete search history.

(56) References Cited

U.S. PATENT DOCUMENTS

| 6,101,447 | A  | * | 8/2000  | Poe, Jr. ........................ 702/13 |
| 2003/0036890 | A1 | * | 2/2003  | Billet et al. ..................... 703/2 |
| 2006/0173559 | A1 | * | 8/2006  | Kirshenbaum et al. ........ 700/31 |
| 2007/0288214 | A1 | * | 12/2007 | DeMartini et al. ............ 703/10 |

OTHER PUBLICATIONS

Bissell et al., History Matching Using the Method of Gradients: Two Case Studies, Paper SPE 28590 presented at the SPE 69th Annual Technical Conference and Exhibition held in New Orleans, Louisiana, U.S.A., Sep. 25-28, 1994, Society of Petroleum Engineers, Inc., pp. 275-290.

Castellini et al., Practical Methods for Uncertainty Assessment of Flow Predictions for Reservoirs with Significant History—A Field Case Study, Paper A-33, 9th European Conference on the Mathematics of Oil Recovery (ECMOR IX), Cannes, France, Aug. 30-Sep. 2, 2004, pp. 1-8.

Eide et al., Automatic History Matching by use of Response Surfaces and Experimental Design, presented at the 4th European Conference on the Mathematics of Oil Recovery, Roros, Norway, Jun. 7-10, 1994, pp. 1-14.

Fang et al., Uniform Design: Theory and Application, Technometrics, Aug. 2000, pp. 237-248, vol. 42, No. 3, American Statistical Association and the American Society for Quality.

Koza, Genetic Programming: A Paradigm for Genetically Breeding Populations of Computer Programs to Solve Problems, Computer Science Department, Stanford University, Margaret Jacks Hall, Stanford, California 94305, Jun. 1990, pp. 1-127.

(Continued)

*Primary Examiner*—David R Vincent
*Assistant Examiner*—Kalpana Bharadwaj
(74) *Attorney, Agent, or Firm*—Maurice Teixeira

(57) ABSTRACT

A method utilizing genetic programming to construct history matching and forecasting proxies for reservoir simulators. Acting as surrogates for computer simulators, the genetic programming proxies evaluate a large number of reservoir models and predict future production forecasts for petroleum reservoirs.

12 Claims, 14 Drawing Sheets

OTHER PUBLICATIONS

Landa et al., A Methodology for History Matching and the Assessment of Uncertainties Associated with Flow rediction, Paper SPE 84465 presented at the SPE Annual Technical Conference and Exhibition held in Denver, Colorado, U.S.A., Oct. 5-8, 2003, Society of Petroleum Engineers Inc., pp. 1-14.

Wen et al., Coupling Sequential-Self Calibration and Genetic Algorithms to Integrate Production Data in Geostatiscal Reservoir Modeling, In Proceedings of the Seventh Geostatistics Congress, (2004), pp. 1-10.

Yeten et al., A Comparison Study on Experimental Design and Response Surface Methodologies, Paper SPE 93347 presented at the 2005 SPE Reservoir Simulation Symposium held in Houston, Texas U.S.A., Jan. 31-Feb. 2, 2005, Society of Petroleum Engineers Inc., pp. 1-15.

Yu et al., A Hybrid of Sequential-Self Calibration and Genetic Algorithm Inversion Technique for Geostatistical Reservoir Modeling, In Proceedings of the IEEE World Congress on Computational Intelligence, Vancouver, BC, Canada, Jul. 16-21, 2006.

* cited by examiner

METHOD FOR FORECASTING THE PRODUCTION OF A PETROLEUM RESERVOIR UTILIZING GENETIC PROGRAMMING

BACKGROUND OF THE INVENTION

This invention relates to the management of oil or gas reservoirs, and more particularly, to the analysis of the production of petroleum reservoirs.

A petroleum reservoir is a zone in the earth that contains, or is thought to contain, one or more sources of commercially viable quantities of recoverable oil or gas. When such a reservoir is found, typically one or more wells are drilled into the earth to tap into the source(s) of oil or gas for producing them to the surface.

The art and science of managing petroleum reservoirs has progressed over the years. Various techniques have been used for trying to determine if sufficient oil or gas is in the given reservoir to warrant drilling, and if so, how best to develop the reservoir to produce the oil or gas that is actually found.

Every reservoir is unique because of the myriad of geological and fluid dynamic characteristics. Thus, the production of petroleum from reservoir to reservoir can vary drastically. These variations make it difficult to simply predict the amount of fluids and gases a reservoir will produce and the amount of resources it will require to produce from a particular reservoir. However, parties which are interested in producing from a reservoir need to project the production of the reservoir with some accuracy in order to determine the feasibility of producing from the reservoir. Therefore, in order to accurately forecast production rates from all of the wells in a reservoir, it is necessary to build a detailed computer model of the reservoir.

Prior art computer analysis of production for an oil reservoir is usually divided into two phases, history matching and prediction.

When an oil field is first discovered, a reservoir model is constructed utilizing geological data. Geological data can include such characteristics as the porosity and permeability of the reservoir rocks, the thickness of the geological zones, the location and characteristics of geological faults, and relative permeability and capillary pressure functions. This type of modeling is a forward modeling task and can be accomplished using statistical or soft computing methods. Once the petroleum field enters into the production stage, many changes take place in the reservoir. For example, the extraction of oil/gas/water from the field causes the fluid pressure of the field to change. In order to obtain the most current state of a reservoir, these changes need to be reflected in the model.

History matching is the process of updating reservoir descriptor parameters in a given computer model to reflect such changes, based on production data collected from the field. Production data essentially give the fluid dynamics of the field, examples include water, oil and pressure information, well locations and performances. Thus, reservoir models use empirically acquired data to describe a field. Input parameters are combined with and manipulated by mathematical models whose output describes specified characteristics of the field at a future time and in terms of measurable quantities such as the production or injection rates of individual wells and groups of wells, the bottom hole or tubing head pressure at each well, and the distribution of pressure and fluid phases within the reservoir.

In the history matching phase, geological data and production data of the reservoir and its wells are used to build a mathematical model which can predict production rates form wells in the reservoir. The process of history matching is an inverse problem. In this problem, a reservoir model is a "black box" with unknown parameter values. Given the water/oil rates and other production information collected from the field, the task is to identify these unknown parameter values such that the reservoir gives flow outputs matching the production data. Since inverse problems have no unique solutions, i.e., more than one combination of reservoir parameter values give the same flow outputs, a large number of well-matched or "good" reservoir models needs to be obtained in order to achieve a high degree of confidence in the history-matching results.

Initially, a base geological model is provided. Next, parameters which are believed to have an impact on the reservoir fluid flow are selected. Based on their knowledge about the field, geologists and petroleum engineers then determine the possible value ranges of these parameters and use these values to conduct computer simulation runs.

A computer reservoir simulator is a program which consists of mathematical equations that describe fluid dynamics of a reservoir under different conditions. The simulator takes a set of reservoir parameter values as inputs and returns a set of fluid flow information as outputs. The outputs are usually a time-series over a specified period of time. That time-series is then compared with the historical production data to evaluate their match. Experts modify the input parameters of the computer model involved in that particular simulation of the reservoir on the basis of the differences between computed and actual production performance and rerun the simulation of the computer model. This process continues until the computer or mathematical model behaves like the real oil reservoir.

The prior art manual process of history matching is subjective and labor-intensive, because the input reservoir parameters are adjusted one at a time to refine the computer simulations. The accuracy of the prior art history matching process largely depends on the experiences of the geoscientists involved in modifying the geological and production data. Consequently, the reliability of the forecasting is often very short-lives, and the business decisions made based on those models have a large degree of uncertainty.

As described-above, the prior art history matching process is very time consuming. On average, each run takes 2 to 10 hours to complete. Moreover, there can be more than one computer model with different input parameters which can produce flow outputs that are acceptable matches to the historical production data of the reservoir. This is particularly evident when the reservoir has a long production history and the quality of production data is poor. Determining which models can produce acceptable matches of the production data from a large pool of potentially acceptable computer models is cost prohibitive and time consuming. Because of those restrictions, only a small number of simulations can be run, and consequently only a small number of acceptable models are identified. As a result, the prior art history matching process is associated with a large degree of uncertainty as to the actual real world reservoir configuration. That large degree of uncertainty in the history matching phase also translates into a large degree of variability in the future production forecasts.

There is a need to identify large numbers of acceptable computer models in the history matching phase that are consistent with the geological data and the historical production data for a given reservoir. The facilitation of multiple realizations in history matching enables one to reduce the uncertainty in the reservoir models.

The second phase of the computer analysis of production for the oil reservoir is prediction or forecasting. Once an acceptable computer model has been identified, alternative operating plans of the reservoir are simulated and the results are compared to optimize the oil recovery and minimize the production costs. Because of the uncertainty in the reservoir model that has been generated from the prior art history matching process, any future production profile forecasted by that model also has a high degree of uncertainty associated with it.

In addition, as described-above, there are a number of computer models that have to be utilized in the prediction phase in order to reduce the uncertainty in the production forecasts. For each good model that was identified in the history matching phase, computer simulations are run to give a future production profile. In this manner, a range of production forecasts are determined and used to optimize the future production of the reservoir. As with the simulations in the history matching phase, the computer simulation phase is time consuming and requires a great deal of expertise which limits the number of acceptable computer models that can be used in the prior art prediction phase. There is a need to efficiently analyze large numbers of acceptable computer models which have been identified in the history matching phase of the analysis of production for the oil reservoir.

Even when experts are used in the analysis, there is much educated trial and error effort spent in choosing acceptable reservoir models in the history matching phase, running the simulations of the models, determining the optimal inputs for the models to predict future production forecasts, and analyzing the results from the models to determine the correct forecasts or a range of forecasts. This is time consuming and expensive, and it requires a highly skilled human expert to provide useful results.

If the potential pool of reservoir models in the history matching phase of the analysis is under-sampled, the uncertainty in the computer analysis of production for the reservoir will increase. There is, therefore, a need to sample and identify as many acceptable reservoir models in the history matching phase as possible to reduce the degree of uncertainty associated with the results of the computer analysis. There is also a need to be able to efficiently analyze those identified acceptable models and provide production forecasts for the reservoir.

The ability to more quickly and less expensively analyze a reservoir by whatever means is becoming increasingly important. Companies that develop oil or gas reservoirs are basing business decisions on entire reservoir analysis rather than just on individual wells in the field. Even after a field development plan is put into action, the computer analysis of production of the reservoir is periodically rerun and further tuned to improve the ability to match newly gathered production data. Because these decisions need to be made quickly as opportunities present themselves, there is the need for an improved method of analyzing petroleum reservoirs and, particularly, for accurately forecasting the oil and/or gas production of the reservoirs into the future.

SUMMARY OF THE INVENTION

The present invention overcomes the above-described and other shortcomings of the prior art by providing a novel and an improved method of utilizing computer models for predicting future production forecasts of petroleum reservoirs.

In one embodiment of the present invention, for the history matching phase, an initial sampling of reservoir models which is related to a much larger set of possible reservoir models representing a petroleum reservoir is produced. A historical production profile is generated for each of this initial sample of reservoir models. Each of the initial samples of reservoir models is qualified as either acceptable or unacceptable with respect to the historical production profiles to produce a historical set of quantifications. The historical set of qualifications is input into a genetic program in order to generate a historical proxy. The historical proxy is then applied to the large set of possible reservoir models, and each model of the large set of reservoir models is qualified as either acceptable or unacceptable to identify a set of acceptable reservoir models.

For the forecasting or prediction phase of the present invention, a future production profile is generated for each of the initial sample of reservoir models. The initial sample of reservoir models is quantified with respect to the future production profiles to produce forecasting characterizations. The forecasting characterizations are input into genetic programming to generate a forecasting proxy. The forecasting proxy is then applied to the set of acceptable reservoir models from the history matching process to produce a range of production forecasts for the reservoir.

The present invention provides a more efficient method of forecasting oil and gas production of reservoirs into the future than the prior art. The present invention is also more accurate than prior art methods. The present invention is able to identify acceptable reservoir models for a given petroleum field from potentially millions of reservoir models in the history matching phase. The present invention is also able to utilize each of those acceptable reservoir models and produce an accurate range of production forecasts for the petroleum reservoir. The present invention greatly increases the degree of confidence than that of prior art methods.

The method of the present invention offers further differences over the prior art. Analysis of the production of petroleum reservoir is an ongoing process. As described-above, models are constantly being rerun and further tuned to improve their ability to match newly gathered production data. The present invention is more efficient than the prior art and does not assume any prior function form or model, thus no prior bias need be introduced into the analysis.

One embodiment of the present invention improves the accuracy of the computer analysis of production for oil reservoirs by uniformly sampling a dense distribution of reservoir models in an input parameter space. The results of that sampling are used to produce multiple models that accurately match the production data history. Those models are then used to predict future production forecasts.

One object of the present invention is to identify the most significant parameters of the reservoir and systematically integrate those parameters into the analysis.

Another object of the present invention is to classify the reservoir models that match the historical data of the reservoir. Alternatively, a further object of the present invention is to classify the reservoir models that do not match the historical data of the reservoir.

An additional object of the present invention is to identify common characteristics for reservoir models that do match the historical data of the reservoir, and for reservoir models that do not match the historical data.

Additional features and advantages of the present invention are described in, and will be apparent from, the following Detailed Description of the Invention and the Figures.

BRIEF DESCRIPTION OF THE DRAWINGS

These and other objects, features and advantages of the present invention will become better understood with regard to the following description, pending claims and accompanying drawings where:

DETAILED DESCRIPTION OF THE INVENTION

Figure 1:
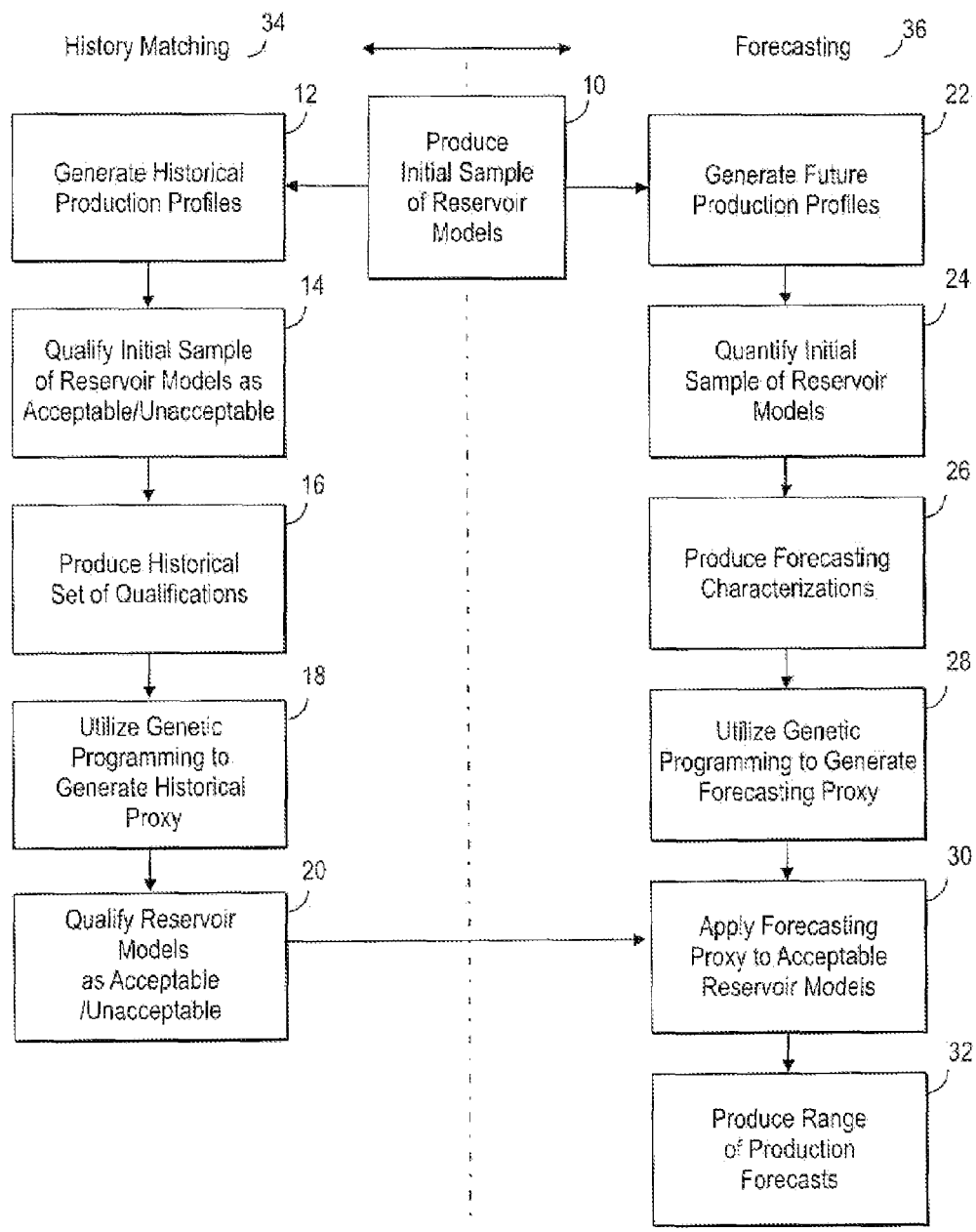
FIG. 1 illustrates a flowchart of the workflow of one embodiment of the present invention.

While this invention is susceptible of embodiments in many different forms, there are shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

The present invention allows one to analyze an oil or gas reservoir and provide more reliable future production forecasts than existing prior art methods. The future production forecasts can then be used to determine how to further develop the reservoir.

To improve the confidence in the production forecasts of reservoir models, a dense distribution of reservoir models needs to be sampled. Additionally, there needs to be a method for identifying which of those models provide a good match to the production data history of the reservoir. With that information, only good models will be used in the analysis for estimating future production and this will result in a greater degree of confidence in the forecasting results.

The present invention accomplishes these goals and one embodiment of the present invention is illustrated in FIG. 1. The present invention includes producing an initial sample of reservoir models 10 which is related to a plurality of reservoir models. The plurality of reservoir models being much larger than the initial sample of reservoir models. Two sets of data are generated, historical production profiles 12 and future production profiles 22. The historical production profiles are used to qualify each of the initial sample of reservoir models as either "good" or "bad", or "acceptable" or "unacceptable" 14. A historical set of qualifications is then produced 16, and genetic symbolic regression is sued to construct a history matching proxy 18.

By way of further background, optimization methods known as "genetic algorithms" are known in the art. Conventional genetic algorithms serve to select a string referred to as a "solution vector", or "chromosome"), consisting of digits ("genes") having values ("alleles") that provide the optimum value when applied to a "fitness function" modeling the desired optimization situation. According to this technique, a group, or "generation", of chromosomes is randomly generated, and the fitness function is evaluated for each chromosome. A successor generation is then produced from the previous generation, with selection made according to the evaluated fitness function; for example, a probability function may assign a probability value to each of the chromosomes in the generation according to its fitness function value. In any case, a chromosome that produced a higher fitness function value is more likely to be selected for use in producing the next generation than a chromosome that produced a lower fitness function value. This is done by first selecting fitter chromosomes from the current generation to build a "reproduction pool". Pairs of chromosomes are then randomly selected, from the reproduction pool to produce offspring by exchanging "genes" on either side of a "crossover" point between the two chromosomes. Additionally, mutation may be introduced through the random alteration of a small fraction (e.g., 1/1000) of the genes on the new offspring. These new offspring form a new generation of population. Iterative evaluation and reproduction of the chromosomes in this manner eventually converges upon an optimized chromosome.

Unlike the known prior art methods of genetic programming, the present invention employs a new variation of genetic algorithms to construct a historical proxy 18. In the present invention, the genetic programming differs from prior art genetic algorithms in that the chromosome is a mathematical function. The output of the function is used to decide if a reservoir models is an acceptable or unacceptable match to the historical set of qualifications 20 according to the criterion decided by experts. In other words, the historical proxy functions as a classifier to separate "good" models from "bad" models in the parameter space 14. The actual amount of fluid produced by the reservoir models is not estimated by the historical proxy. This is very different from prior art reservoir simulator proxies which give the same type of output as the full simulator.

As illustrated in FIG. 1, the historical proxy functions as a genetic programming classifier which is used to separate acceptable models from unacceptable models in the plurality of reservoir models 20. The historical proxy is used to sample a dense distribution of reservoir models in the parameter space (potentially millions of models). Acceptable reservoir models are designated, and those acceptable reservoir models will be used to forecast future production. Since the future production forecast will be based upon such a large number of acceptable reservoir models, the results are more representative and closer to reality than the results of the prior art.

In the forecasting phase 36 of the present invention, as shown in FIG. 1, future production profiles are generated for each of the initial sample of reservoir models 22. The future production profiles are then used to quantify each of the initial sample of reservoir models 24 to produce forecasting characterizations 26. Genetic programming utilizes the forecasting characterizations to generate a forecasting proxy 28. The forecasting proxy is then applied to the set of acceptable reservoir models 30 identified in the history matching phase 34 of the present invention to produce a range of production forecasts 32. The present invention is thus able to efficiently predict a range of production forecasts with a lesser degree of uncertainty than the prior art.

Figure 2:
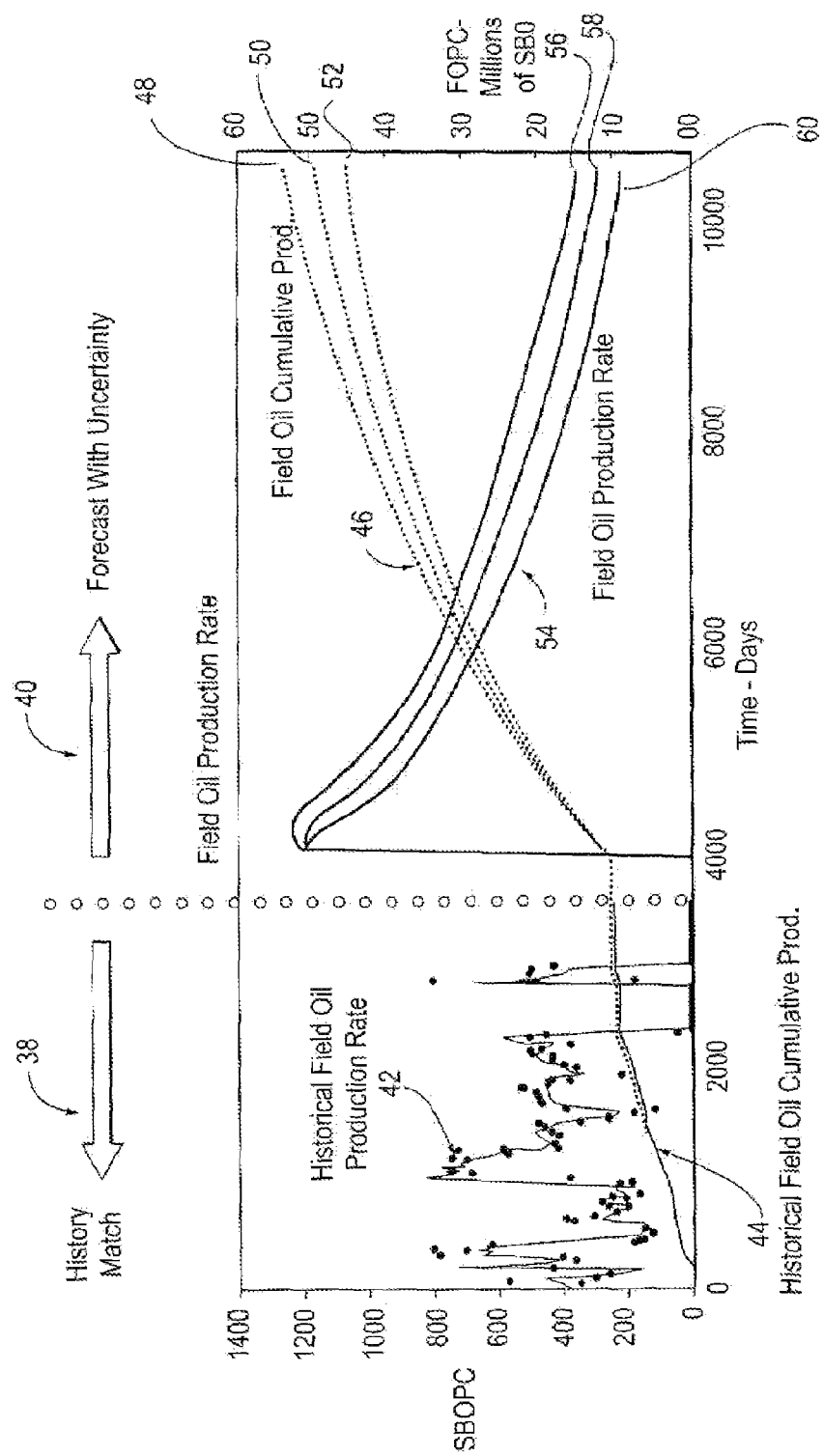
FIG. 2 illustrates a graph of the general workflow of the history matching and forecast phase of an analysis of production for oil reservoirs.

FIG. 2 provides an illustration of the general workflow of the history matching 38 and the forecast phase 40 of the analysis. In this example, the historical data which is used in the history match phase 38 is the Historical Field Oil Production Rate 42 and the Historical Field Oil Cumulative Production 44. It should be understood that other historical production data can be used other than the two sets of data identified in FIG. 2. In the history matching phase 38, models with varying input parameters are run through computer simulations to identify those models which provide acceptable matches with the Historical Field Oil Production Rate 42. Those models are then used in the forecast phase 40 of the analysis.

In the illustration in FIG. 2, the computer models provide forecast ranges for Field Oil Cumulative Production 46 and Field Oil Production Rate 54. The forecast range for the Field Oil Cumulative Production 46 is illustrated as P90 48, P50 50 and P10 52. Similarly, the forecast range for the Field Oil Production Rate 54 is illustrated as P90 56, P50 58 and P10 60. The present invention greatly reduces the uncertainty associated with the analysis by assuring that a larger pool of models are sampled and a larger pool of acceptable models are modified.

Figure 3:
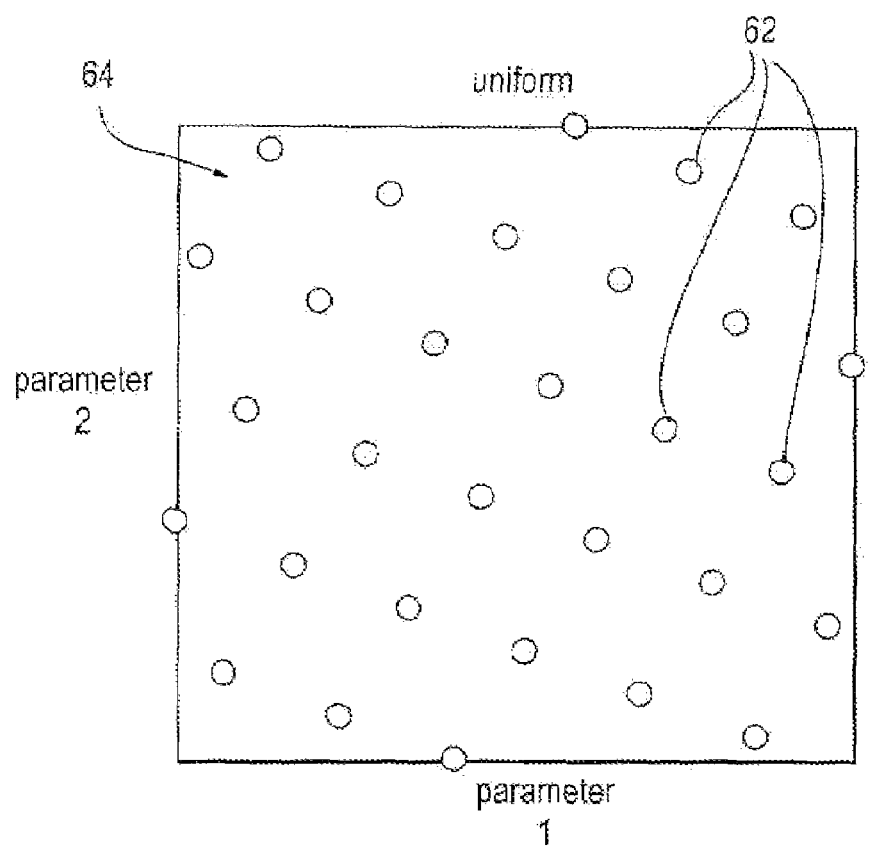
FIG. 3 illustrates a uniform design for sampling input parameters in an embodiment of the present invention.

One embodiment of the present invention utilizes uniform sampling to further reduce the uncertainty with the computer analysis of production for oil reservoirs. FIG. 3 provides an illustration of the uniform sampling method. The uniform sampling generates a sampling distribution 62 that covers the entire parameter space 64 for a predetermined number of runs. It ensures that no large regions of the parameter space 64 are left under sampled. Such coverage is used to obtain simulation data for the construction of a robust proxy that is able to interpolate all intermediate points in the parameter space 64.

Figure 4:
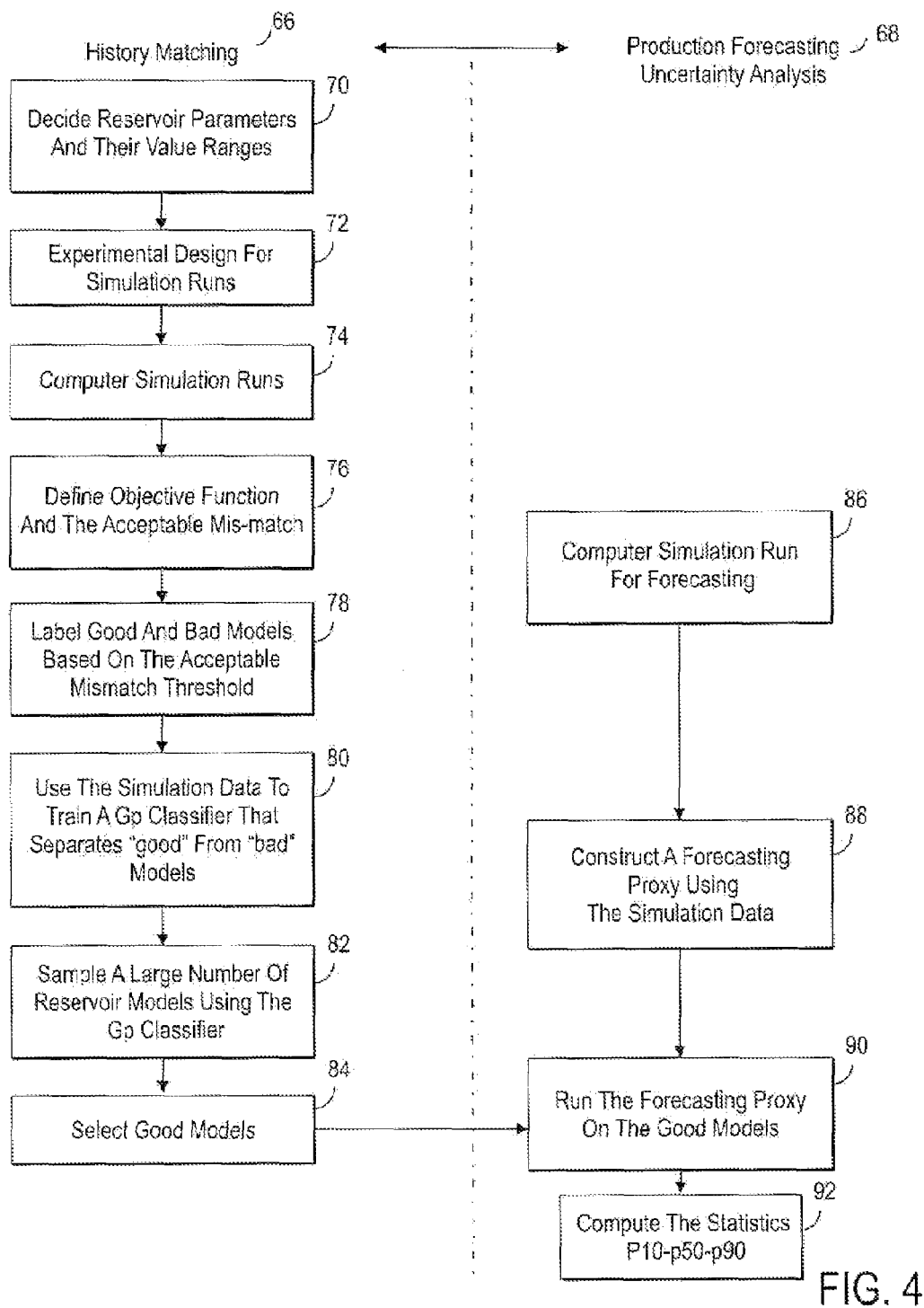
FIG. 4 illustrates a flowchart of the workflow of one embodiment of the present invention.

One such embodiment of the present invention which utilizes uniform sampling is illustrated in FIG. 4. Initially, in the history matching phase 66, reservoir parameters and their value ranges are decided by reservoir experts 70. The number of simulation runs and the associated parameter values are then determined according to uniform design 72. With these parameters, the computer simulations in the history matching phase are run 74. Once the simulations in the history matching phase are completed 74, the objective function and the matching threshold (the acceptable mismatch between simulation results and production data) are defined 76. Those models which pass the threshold are labeled as "good" while the others are labeled as "bad" 78. These simulation results are then used by the genetic programming symbolic regression function to construct a proxy that separates good models from bad models 80. With this genetic programming classifier as the simulator proxy, a dense distribution of the parameter space can then be sampled 82. The models that are identified as good are selected for forecasting future production 84.

Forecasting future production of the field also requires computer simulation. Since the umber of good models identified by the genetic programming proxy is normally quite large, it is not practical to make all of the simulation runs with the good models. Similar to the way the simulator proxy is constructed for history matching, a second genetic programming proxy is generated for production forecast. As shown on the right side of FIG. 4, the simulation results again based on uniform sampling 86 will be used to construct a genetic programming forecasting proxy 88. This proxy is then applied to all the good models identified in the history matching phase 90. Based on the forecasting results, uncertainty statistics such as the P10, P50 and P90 are then estimated 92.

The applicants have conducted a case study using one embodiment of the present invention on a large oil field. The subject oil field has over one billion barrels of original oil in place and has been in production for more than 30 years. Due to the long production history, the data collected from the field were not consistent and the quality of the data was not reliable.

Figure 5:
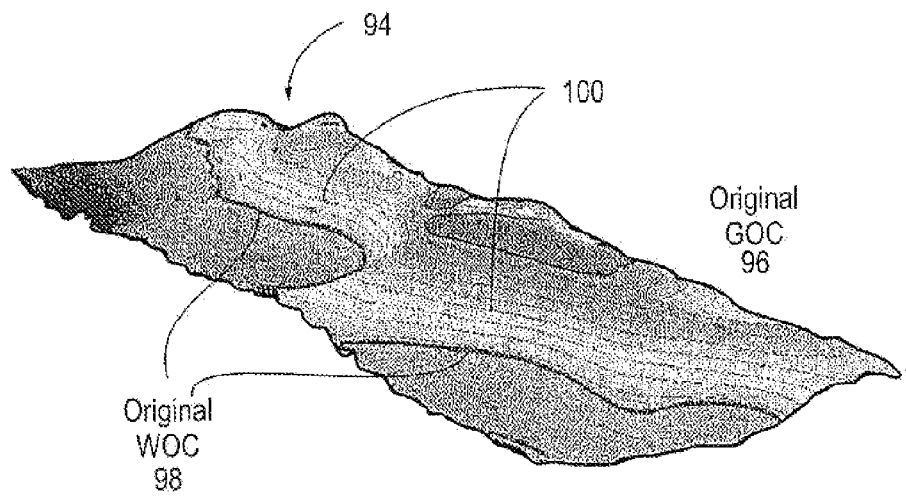
FIG. 5 illustrates a 3D structural view of an oil field which was analyzed using an embodiment of the present invention.
Figure 6:
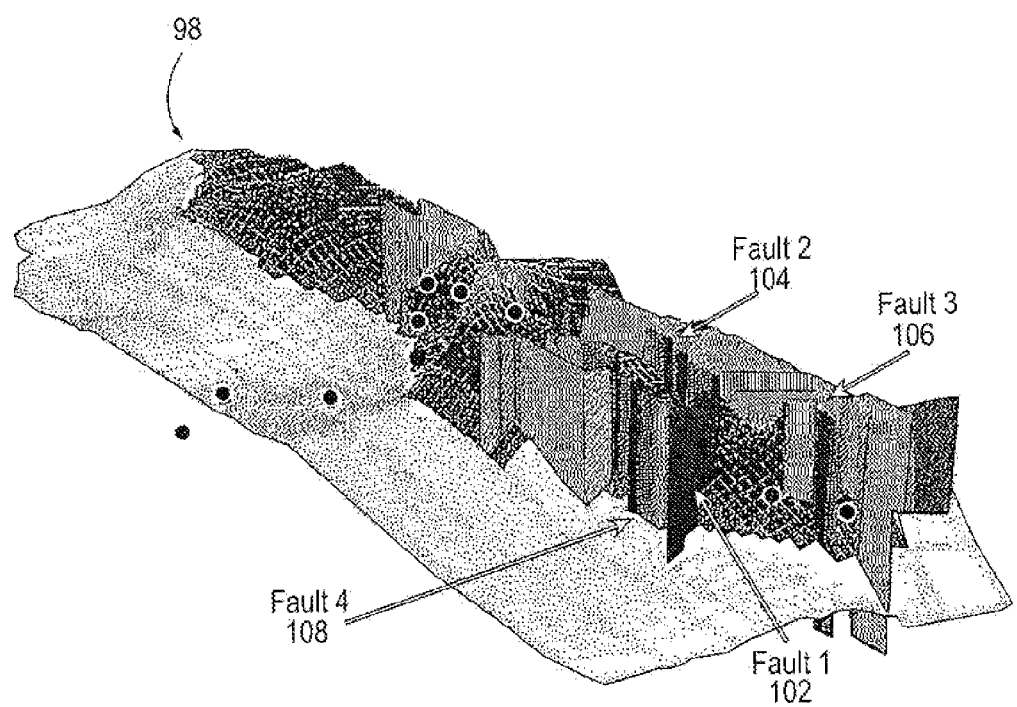
FIG. 6 illustrates a 3D view of the reservoir compartmentalization of an oil field which was analyzed using one embodiment of the present invention.

The oil field in the case study is overlain by a significant gas cap. FIG. 5 shows the oil field 94 and the gas oil contact ("GOC") line 96 that separates the gas cap from the underneath oil. Similarly, there is a water oil contact (WOC) line 98 that separates oil from the water below. The area 100 between the GOC line 96 and WOC line 98 is the oil volume to be recovered. The field 94 also has 4 geological faults 102, 104, 106, 108, illustrated in FIG. 6, which affect the oil flow patterns. Those faults 102, 104, 106, 108 have to be considered in the computer flow simulation.

As a mature field 94 with most of its oil recovered, the reservoir now has pore space which can be used for storage. One proposed plan is to store the gas produced as a side product from neighboring oil fields. In this particular case, the gas produced has no economical value and re-injecting it back into the field was one environmental-friendly method of storing the gas.

In order to evaluate the feasibility of the plan, the cumulative volume of gas that can be injected (stored) in the year 2031 needed to be evaluated. This evaluation would assist managers in making decisions such as how much gas to transport from the neighboring oil fields and the frequency of the transportation.

The cumulative volume of the gas that can be injected is essentially the cumulative volume of the oil that will be produced from the field 94 since this is the amount of space that will become available for gas storage. To answer that question, a production forecasting study of the field 94 in the year 2031 had to be conducted.

Prior to carrying out production forecast, the reservoir model has to be updated through the history matching process. The first step is deciding reservoir parameters and their value ranges for flow simulation. Table I below, shows the 10 parameters which were selected.

TABLE I

| Parameters | Min | Max |
| --- | --- | --- |
| Water Oil Contact (WOC) | 7289 ft | 7389 ft |
| Gas Oil Contact (GOC) | 6522 ft | 6622 ft |
| Fault Transmissibility Multiplier (TRANS) | 0 | 1 |
| Global $K_h$ Multiplier (XYPERM) | 1 | 20 |
| Global $K_v$ Multiplier (ZPERM) | 0.1 | 20 |
| Fairway Y-Perm Multiplier (YPERM) | 0.75 | 4 |
| Fairway $K_v$ Multiplier2 (ZPERM2) | 0.75 | 4 |
| Critical Gas Saturation (SGC) | 0.02 | 0.04 |
| Vertical Communication (ZTRANS) | 0 | 5 |
| Skin at new Gas Injection (SKIN) | 0 | 30 |

Among the 10 parameters, 5 parameters are multipliers in log10 scale. The other 5 parameters are in regular scale. The multiplier parameters are supplied to the base values in each grid of the reservoir model during computer simulation.

The parameters selected for the computer simulation contain not only the ones that affect the history like fluid contacts (WOC and GOC), fault transmissibility (TRANS), permeability (YPERM) and vertical communication in different areas of the reservoir (ZTRANS), but also parameters associated with future installation of new gas injection wells, such as skin effect. In this way, each computation simulation can run beyond history matching and continue for production forecast to the year 2031. With this setup, each computer simulation produces the flow outputs time-series data for both history matching and for production forecasting. In other words, steps 74 and 86 of FIG. 4 are carried out simultaneously.

Based on uniform design, parameter values are selected to conduct 600 computer simulation runs. Each run took about 3 hours to complete using a single CPU machine. Among them, 593 were successful while the other 7 terminated before the simulation was completed.

During the computer simulation, various flow data were generated. Among them, only field water production rate (FWPR) and field gas production rate (FGPR), from the years 1973 to 2004, were used for history matching. The other flow data were ignored because the level of uncertainty associated with the corresponding production data collected from the field.

FWPR and FGPR collected from the field were compared with the simulation outputs from each run. The "error" E, defined as the mismatch between the two, is the sum squared error calculated as follows:

$$E = \sum_{t=1973}^{2004} (\text{FWPR\_obs}_i - \text{FWPR\_sim}_i)^2 + (\text{FGPR\_obs}_i - \text{FGPR\_sim}_i)^2$$

Here, "obs" indicates production data while "sim" indicates computer simulation outputs. The largest E that can be accepted as a good match is 1.2. Additionally, if a model has an E smaller than 1.2 but has any of its FWPR or FGPR simulation outputs too far away from the corresponding production data, the production data was deemed not to be reliable and the entire simulation record is disregarded. Based on this criterion, 12 data points were removed. For the remaining 581 simulation data, 63 were labeled as good models while 518 were labeled as bad models.

It should be appreciated that there are other methods to calculate the error threshold and those are contemplated to be within the scope of the present invention.

Figure 8:
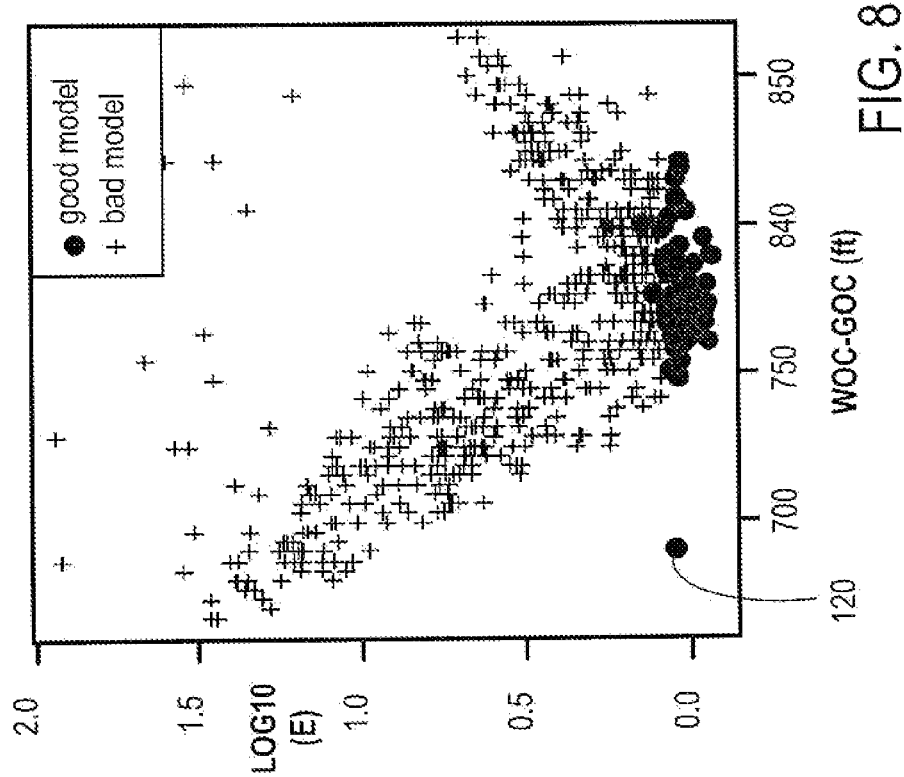
FIG. 8 illustrates a graph for the oil volume, WOC-GOC, compared to the mismatch error, E, for an analysis of an oil field utilizing one embodiment of the present invention.
Figure 7:
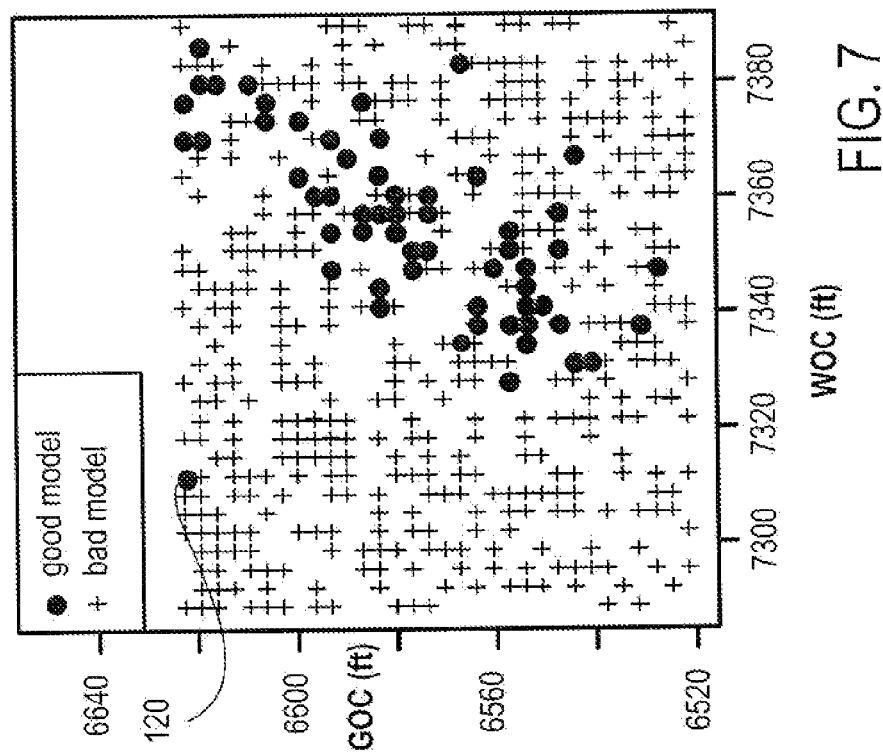
FIG. 7 illustrates a graph for water oil contact, WOC, compared to the gas oil contact, GOC, for an analysis of an oil field utilizing one embodiment of the present invention.

In this particular embodiment of the present invention, it was discovered that the oil volume (WOC-GOC) had a strong impact on the reservoir flow outputs, hence important to the matching of production data. As shown in FIG. 7, among the 581 sets of simulation data, all 63 good models have their WOC and GOC correlated; when the WOC was low, its GOC was also low, thus preserving the oil volume. With such a correlation, another variable, named "oil volume" (WOC-GOC) was added to the analysis to the original 10 parameters to conduct history matching and production forecast study. In this analysis, good models had an oil volume within the range of 750 and 825 feet, except one model 120 which had an "oil volume" of 690 feet (FIGS. 7 & 8).

In this embodiment of the present invention, an outlier study was performed on the 581 simulation/production data sets due to the poor quality of the production data. The following rationale was used to detect inconsistent production data. Reservoir models with similar parameter values should have produced similar flow outputs during computation simulation, which should have given similar matches to the production data. There should have been a correlation between the reservoir values and the mis-match (E). If this was not the case, it indicated that the data had a different quality from the others and should not have been trusted. Based on that concept, a GP symbolic regression was used to identify the function that describes the correlation.

A commercial genetic programming package, Discipulus™ by RML Technologies, Inc., was used in the study. In this software package, some genetic programming parameters were not fixed but were selected by the software for each run. These genetic programming parameters included population size, maximum program size, and crossover and mutation rates. In the first run, one set of values for these genetic programming parameters was generated. When the run did not produce an improved solution for a certain number of generations, the run was terminated and a new set of genetic programming parameter values was selected by the system to start a new run. The system maintained the best 50 solutions found throughout the multiple runs. When the genetic programming was terminated, the best solution among the pool of 50 solutions was the final solution. In this particular embodiment, the genetic program performed a 120 runs and then was manually terminated.

In addition to the parameters whose values were system generated, there were other genetic programming parameters whose values needed to be specified by the users. Table II provides the values of those genetic programming parameters for symbolic regression for the outlier study.

TABLE II

| Objective | Evolve A Regression To Identify Outliers In Production Data |
|---|---|
| Functions | addition; subtraction; multiplication; division; abs |
| Terminals | The 10 reservoir parameters listed in Table I and WOC-GOC |
| Fitness | $\text{MSE:} \dfrac{\sum_{n=1}^{581}(E_4 - R_1)^2}{581}$, R is regression output |
| Selection | Tournament (4 candidates/2 winners) |

The terminal set consists of 11 reservoir parameters, each of which could be used to build leaf nodes in the genetic programming regression trees. The target is E, which was compared to the regression output R for fitness evaluation. The fitness of an evolved regression was the mean squared error (MSE) of the 581 data points. A tournament selection with size 4 was used. In each tournament, 4 individuals were randomly selected to make 2 pairs. The winners of each pair became parents to generate 2 offspring.

Figure 10:
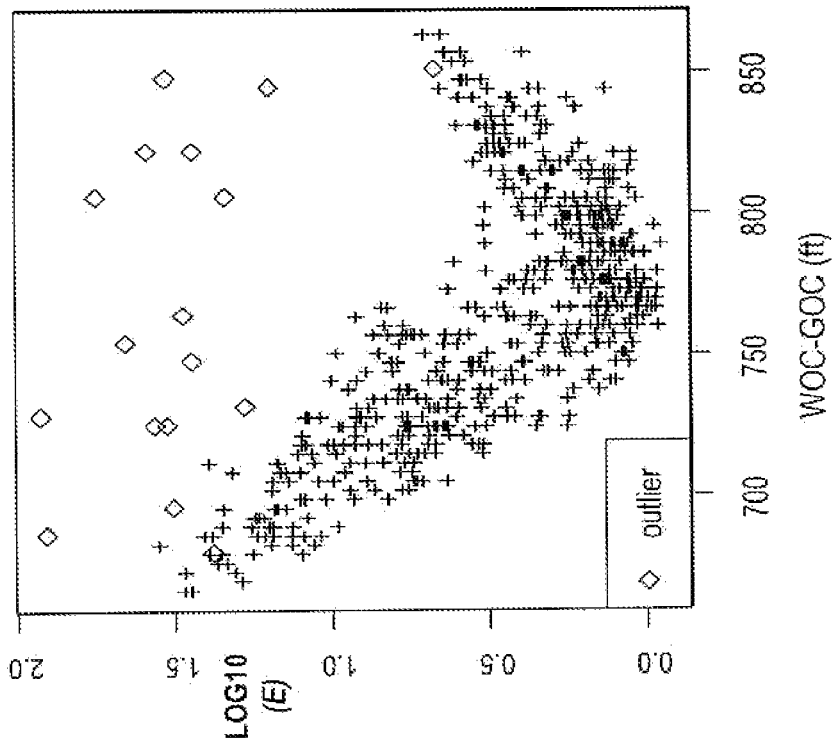
FIG. 10 illustrates a graph for the oil volume, WOC-GOC, compared to the mismatch error, E, for an analysis of an oil field utilizing one embodiment of the present invention.
Figure 9:
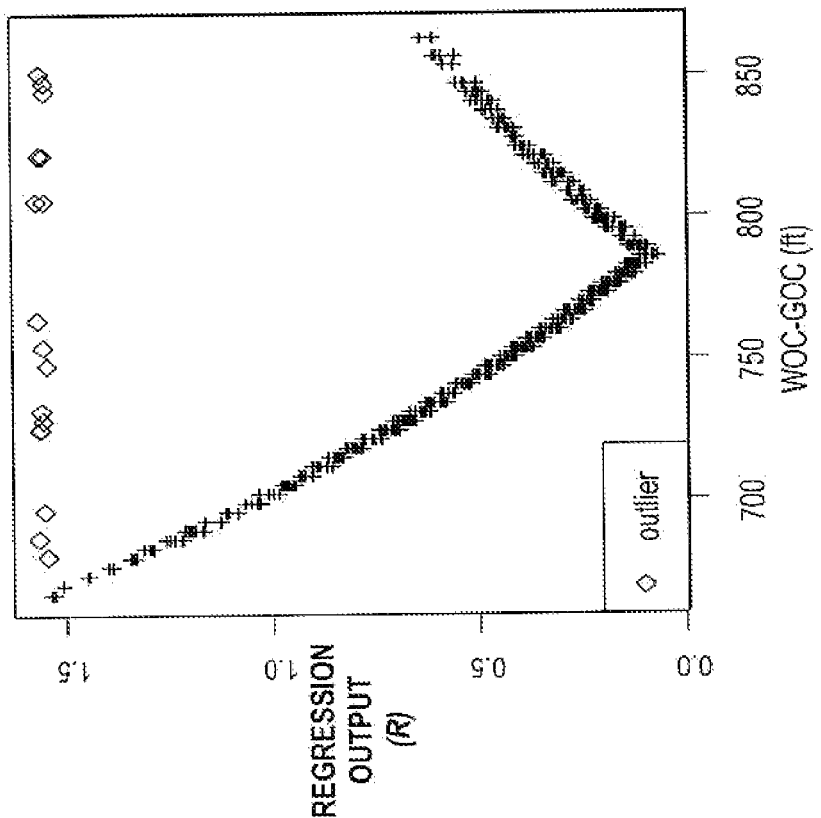
FIG. 9 illustrates a graph for the oil volume, WOC-GOC, compared to the regression output, R for an analysis of an oil field utilizing one embodiment of the present invention.

After the 120 runs, the genetic programming regression contained 4 parameters: WOC-GOC, TRANS, YPERM and SGC. Among them, WOC-GOC was ranked as having the most impact on the match of production data. FIG. 9 shows the relationship between WOC-GOC and the regression output R. From FIG. 9, it is evident that 17 of the data points did not fit into the regression pattern. Those 17 data points also had similar outlier behavior with regard to E (FIG. 10). That behavior evidenced that the 17 production data points were unreliable and were removed from the data set.

Figure 11:
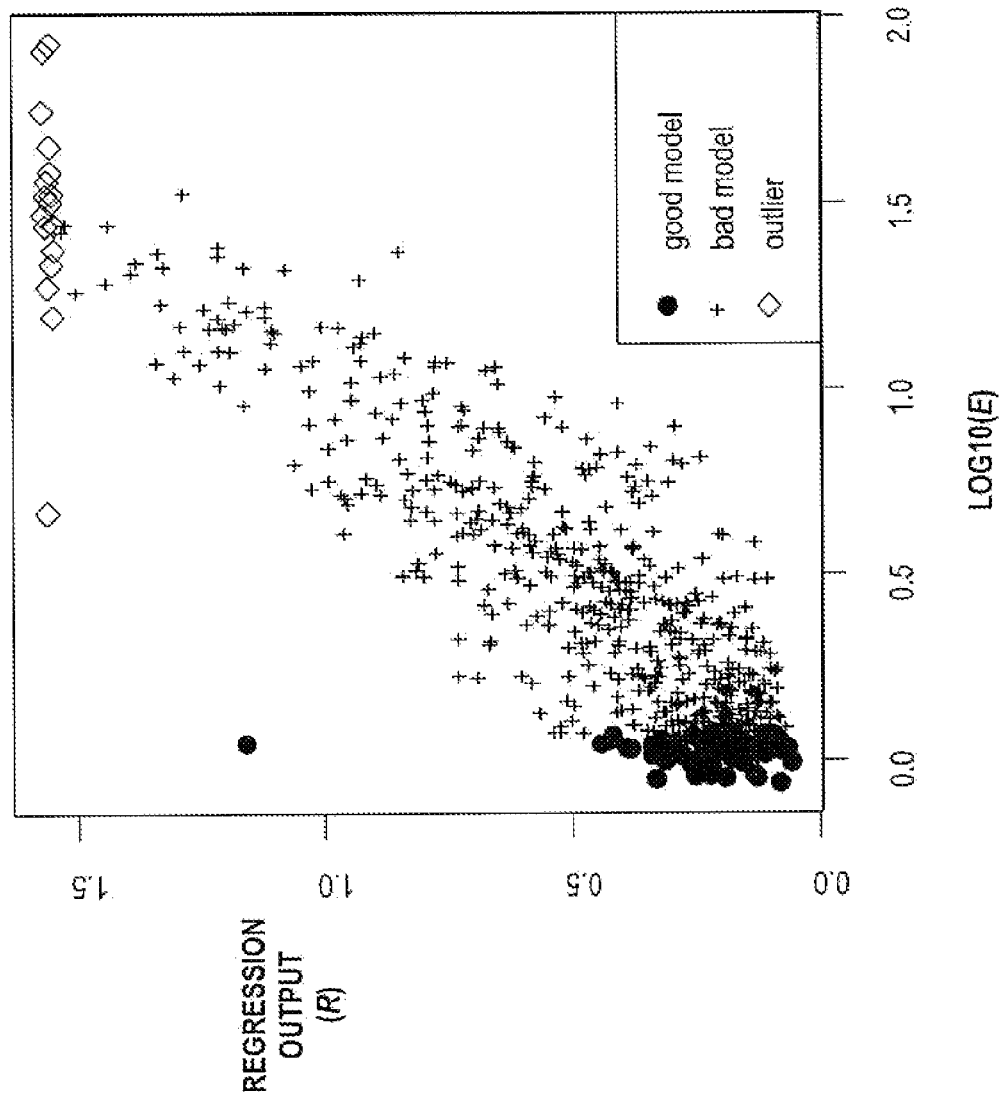
FIG. 11 illustrates a graph for the mismatch error, E, compared to the regression output, R, for an analysis of an oil field utilizing one embodiment of the present invention.

After the outliers were removed, the final data set to construct the simulator proxies consisted of 564 data points; 63 were good models and 501 were bad models as illustrated in FIG. 11. The outlier study was then completed.

The next step in the history matching phase of the analysis was to construct the reservoir simulator proxy or the historical proxy which qualified the reservoir models as good or bad. For this step, the final set of 564 data points were used to construct the genetic programming classifier. Each data point contained 4 input variables (WOC-GOC, TRANS, YPERM and SGC), which were selected by the genetic programming regression outlier study, and one output, E.

With the number of bad models 8 times larger than the number of good models, the data set was very unbalanced. To avoid the genetic programming training process generating classifiers that biased bad models, the good model data was duplicated 5 times to balance the data set. Moreover, the entire data set was used for training, instead of splitting it into training, validation and testing, which is the normal practice to avoid over-fitting. This was again because the number of good models was very small. Splitting them further would have made it impossible for the genetic program to train a proxy that represented the full simulator capacity.

The genetic programming parameter setup for this analysis was different from the setup for the outlier study. In particular, the fitness function was not MSE. Instead, it was based on hit rate: the percentage of the training data that were correctly classified by the regression. Table III includes the genetic programming system parameter values for symbolic regression for the historical proxy.

TABLE III

| Objective | Evolve A Simulator Proxy Classifier For History Matching |
|---|---|
| Functions | addition; subtraction; multiplication; division; abs |
| Terminals | WOC-GOC, TRANS, YPERM, SGC |
| Fitness | Hit rate then MSE |
| Selection | Tournament (4 candidates/2 winners) |

As described-above, the cut point for this particular embodiment for E for a good model was 1.2. When the regression gave an output R less than 1.2, the model was classified as good. If mis-match E was also less than 1.2, the regression made the correct classification. Otherwise, the regression made the wrong classification. A correct classification is called a hit. Hit rate is the percentage of the training that are correctly classified by the regression.

There are cases when two regressions may have the same hit rate. In this particular embodiment, the MSE measurement was used to select the winners. The "tied threshold" for MSE measurement was 0.01% in this work. If two classifiers were tied in both their hit rates and MSE measurements, a winner was randomly selected from the two competitors.

Also, in this particular embodiment of the present invention, instead of the 11 reservoir parameters being utilized to construct the historical proxy, only the 4 reservoir parameters identified by the outlier study to have impacts on fluid flow were used as terminals to construct the historical proxy.

Figure 12:
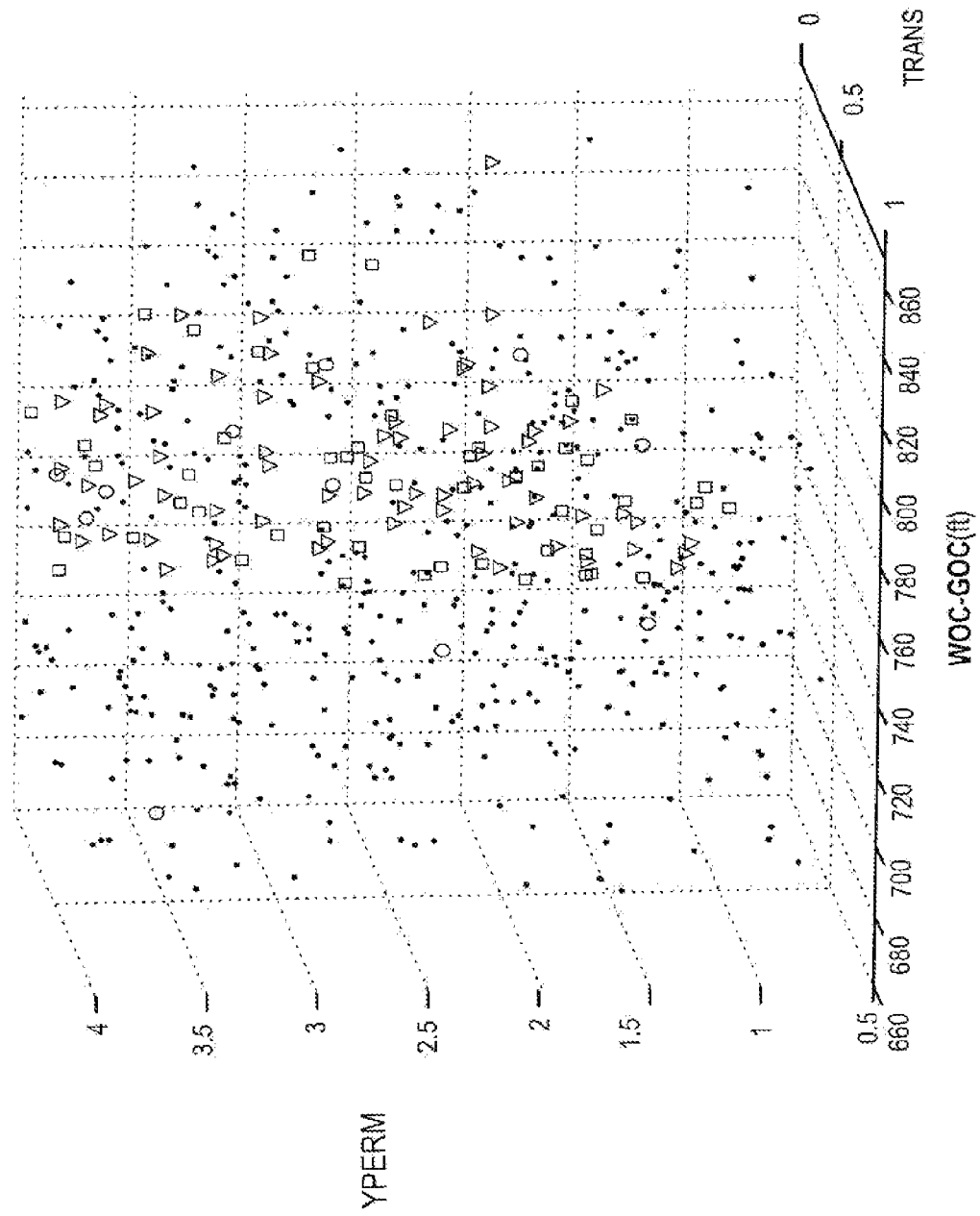
FIG. 12 illustrates a graph showing the genetic programming classification results for an analysis of an oil field utilizing one embodiment of the present invention.

The genetic program completed 120 runs. The regression that had the best classification accuracy at the end of the run was selected as the historical proxy for the simulator. The classification accuracy of the chosen historical proxy was 82.54% on good models and 85.82% on bad models. The overall classification accuracy for the historical proxy was 85.82%. FIG. 12 illustrates the classification results in the parameter spaced defined by WOC-GOC, YPERM and TRANS. FIG. 12 shows that the models with WOC-GOC outside the range of 750 and 825 feet were classified as bad models. Models, however, within that range could be either good or bad depending on other parameter values.

Figure 14:
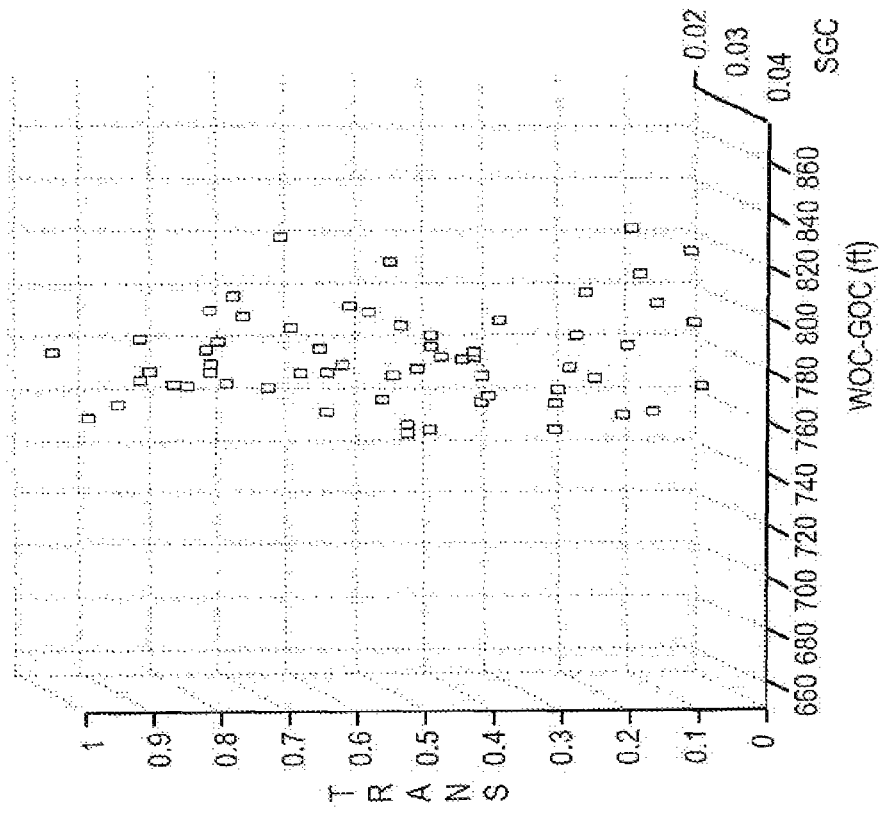
FIG. 14 illustrates a graph showing one view of the good models which were selected by the computer simulator in an analysis of an oil field utilizing one embodiment of the present invention.
Figure 13:
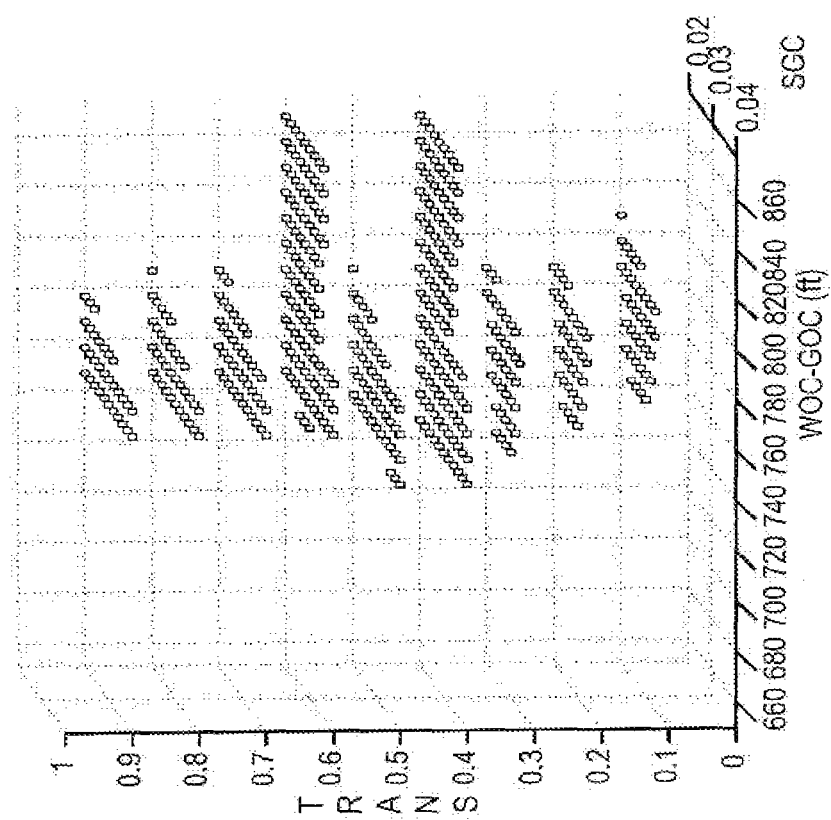
FIG. 13 illustrates a graph showing one view of the good models which were selected by the historical proxy in an analysis of an oil field utilizing one embodiment of the present invention.

The historical proxy was then used to evaluate new sample points in the parameter space. For each of the 5 parameters (GOC-WOC was treated as two parameters), 11 samples were selected, evenly distributed between their minimum and maximum values. The resulting total number of samples was $11^5 = 161{,}051$. The historical proxy was applied to those samples and 28,125 models were identified as good models while 132,926 models were classified as bad models. FIG. 13 illustrates the 28,125 good models in the 3D parameter space defined by WOC-GOC, TRANS and SGC. The pattern is consistent with that of the 63 good models identified by computer simulation which is illustrated in FIG. 14.

Figure 16:
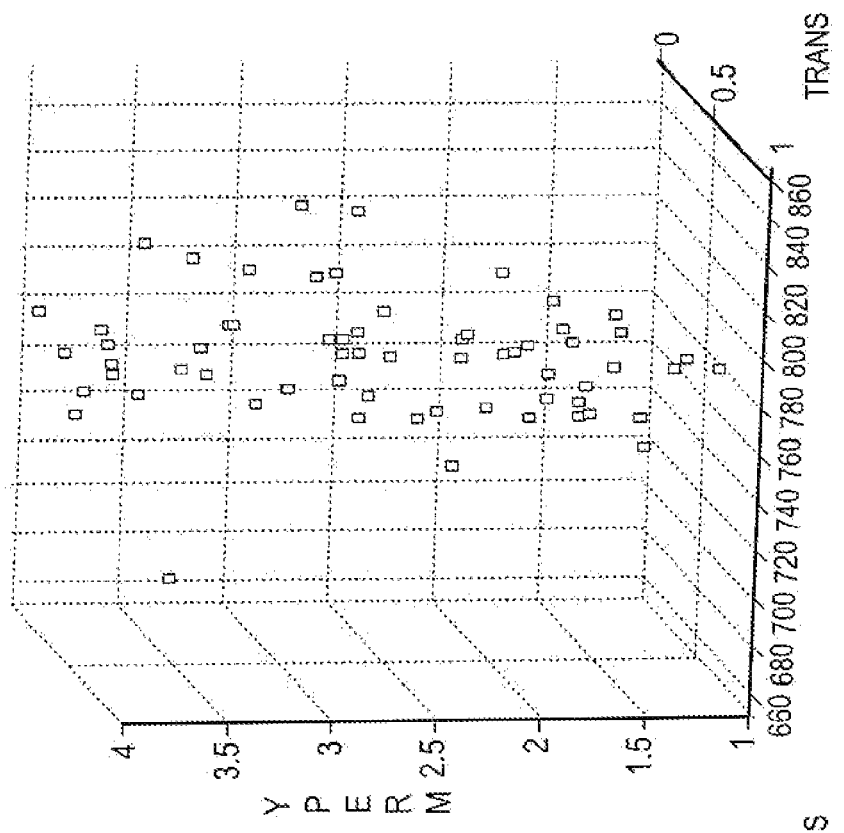
FIG. 16 illustrates a graph showing one view of the good models which were selected by the computer simulator in an analysis of an oil field utilizing one embodiment of the present invention.
Figure 15:
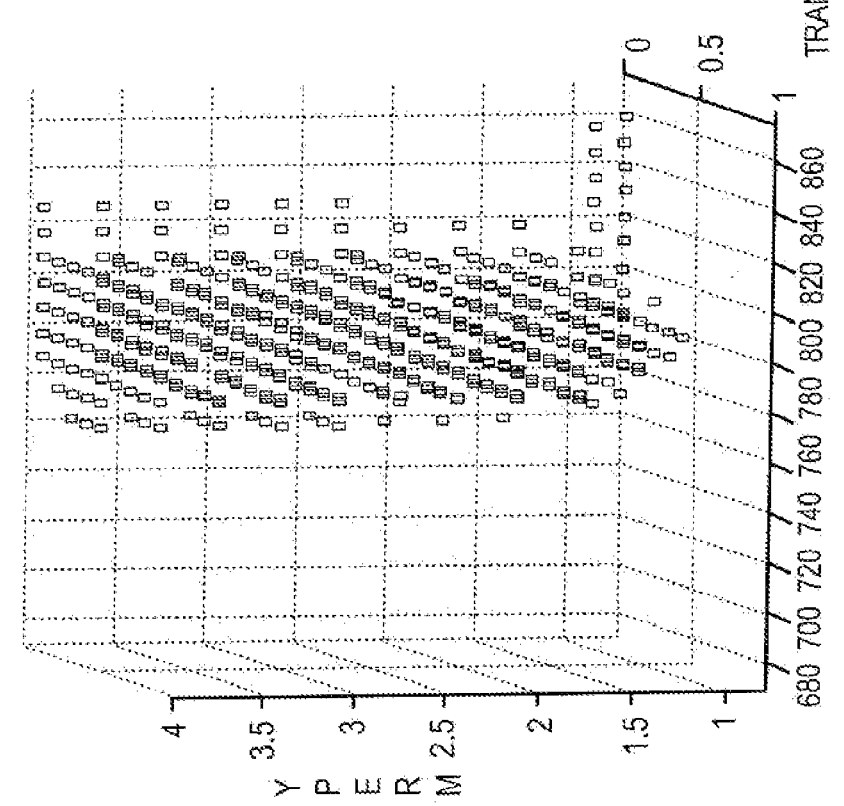
FIG. 15 illustrates a graph showing one view of the good models which were selected by the historical proxy in an analysis of an oil field utilizing one embodiment of the present invention.

Within the 3D parameter space defined by WOC-GOC, YPERM and TRANS, the good models have a slightly different pattern as shown in FIG. 15. Yet the pattern is also consistent with the pattern of the 63 good models identified by computer simulation as illustrated in FIG. 16.

Those results indicated that the genetic programming classifier was a reasonable high-quality proxy for the full reservoir simulator. The 28,125 good models were then considered to be close to reality. Those models revealed certain reservoir characteristics for this particular oil field. They YPERM value was greater than 1.07. The faults separating different geobodies were not completely sealing, the transmissibility was non-zero. The width of the oil column (WOC-GOC) was greater than 750 feet. The 28,125 good models were then used in the production forecast analysis.

The forecast for oil production (or the volume of gas injection) also requires computer simulation. It was not practical to make simulation runs for all 28,125 good models, thus a second proxy was also warranted for this phase of the analysis. In this phase, all 11 reservoir parameters were used to construct the forecasting proxy. The target forecast (F) for this embodiment of the present invention was the cumulative volume of gas injection for the year 2031. The initial 581 data points were divided into three groups: 188 for training, 188 for validation and 188 for blind testing. Training data was used for the genetic program to construct the regression proxy while the validation data was used to select the final regression or the forecasting proxy. The evaluation of the regression proxy was based on its performance on the blind testing data.

The genetic programming parameter set up is set forth in Table IV.

TABLE IV

| | |
|---|---|
| Objective | Evolve A Simulator Proxy For Production Forecast |
| Functions | addition; subtraction; multiplication; division; abs |
| Terminals | The 10 reservoir parameters listed in Table I and WOC-GOC |
| Fitness | MSE: $\dfrac{\sum_{n=1}^{188}(F_1 - R_4)^2}{188}$, F is simulator forecast |
| Selection | Tournament (4 candidates/2 winners) |

The genetic program was allowed to make 120 runs and the regression with the smallest MSE on validation data was selected as the forecasting proxy. Table V below lists the $R^2$ and MSE on the training, validation and blind testing data.

TABLE V

| Data Set | $R^2$ | MSE |
|---|---|---|
| Training | 0.799792775 | 0.001151542 |
| Validation | 0.762180905 | 0.001333534 |
| Testing | 0.7106646 | 0.001550482 |
| All | 0.757354092 | 0.001345186 |

As the forecasting proxy was to make predications for the next 30 years, a $R^2$ in the range of 0.76 was considered to be acceptable.

Figure 17:
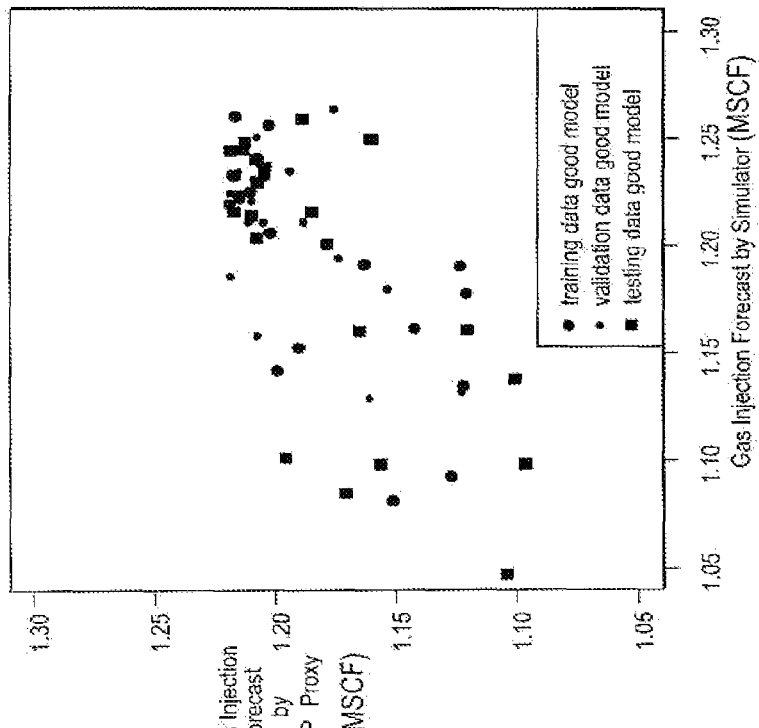
FIG. 17 illustrates a graph for the gas injection forecast by the computer simulator compared to the gas injection forecast by the genetic programming proxy in an analysis of an oil field utilizing one embodiment of the present invention.
Figure 18:
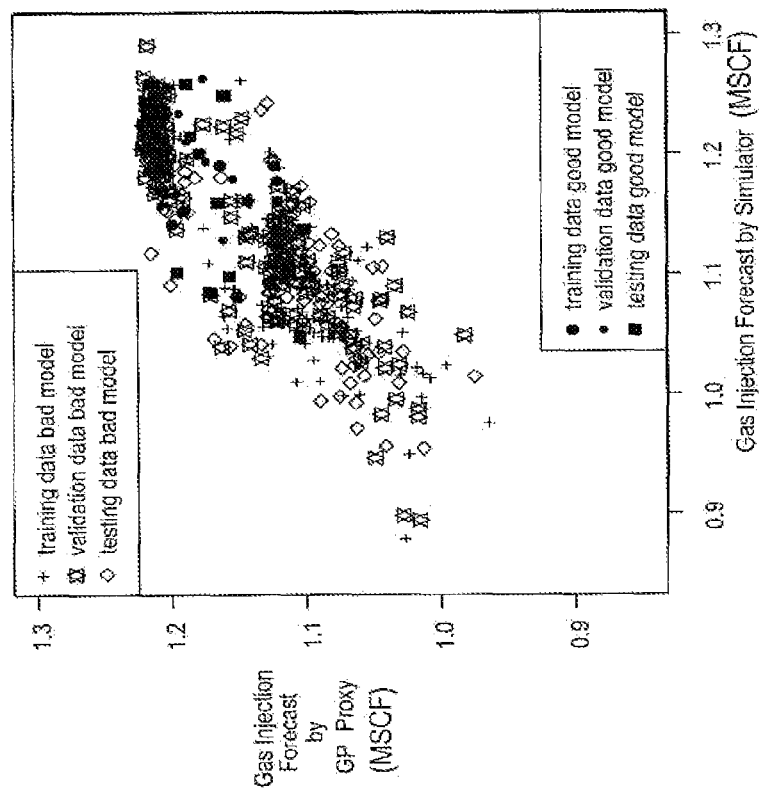
FIG. 18 illustrates a graph for the gas injection forecast on the 63 good models by the computer simulator compared to the gas injection forecast by the genetic programming proxy in an analysis of an oil field utilizing one embodiment of the present invention.

FIG. 17 illustrates the cross-lot for simulator and proxy forecasts on the 581 simulation models. Across all models, the forecasting proxy gave consistent prediction as that by the computer simulator. Forecasting on the 63 good models is illustrated in FIG. 18. In this particular case, the forecasting proxy gave a smaller prediction range (0.12256) than that by the simulator (0.2158).

Similar to the history-matching proxy in this embodiment, WOC-GOC was ranked to have the most impact on production forecasts. The forecasting proxy was then used to derive gas injection production predictions from all good models identified by the by the historical proxy. Since each model selected by the historical proxy was described 6 reservoir parameter values, there was freedom in selecting the values of the other 5 parameters not used by the historical proxy. Each of the 5 unconstrained parameters was sampled by selecting 5 points, evenly distributed between their minimum and maximum values. Each combination of the 5 parameter values was used to complement the 6 parameter values in each of the 28,125 good models to run the forecasting proxy. This resulted in a total of 87,890,625 models being sampled with the forecasting proxy.

Figure 20:
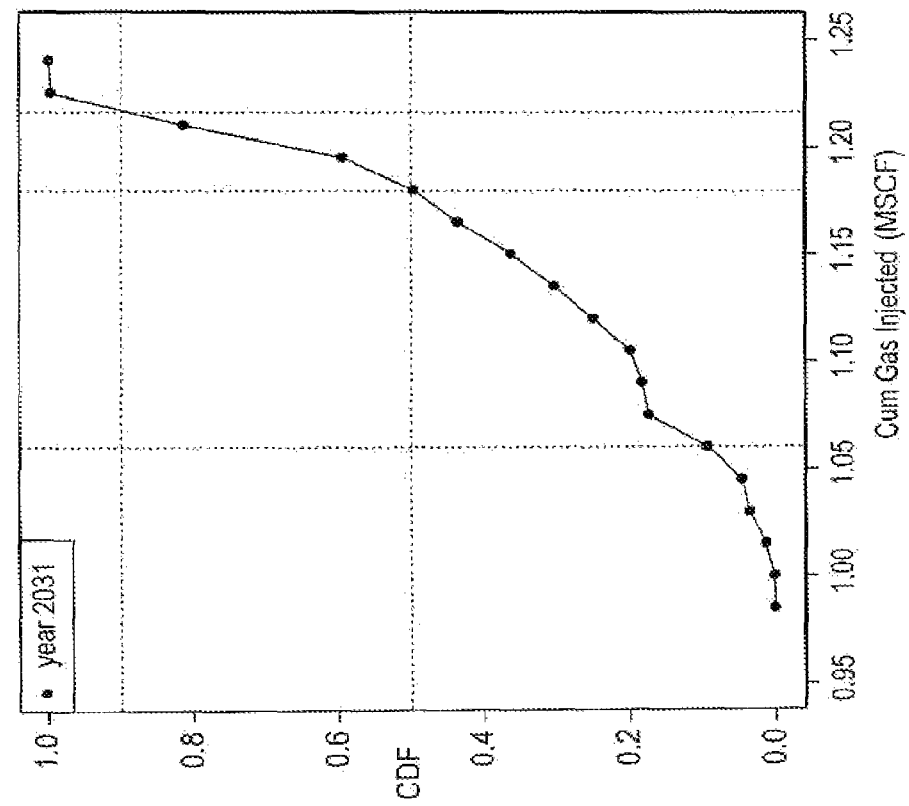
FIGS. 19 and 20 illustrate a graph showing the cumulative gas injection in the year 2031 forecasted by the forecasting proxy in an analysis of an oil field utilizing one embodiment of the present invention.
Figure 19:
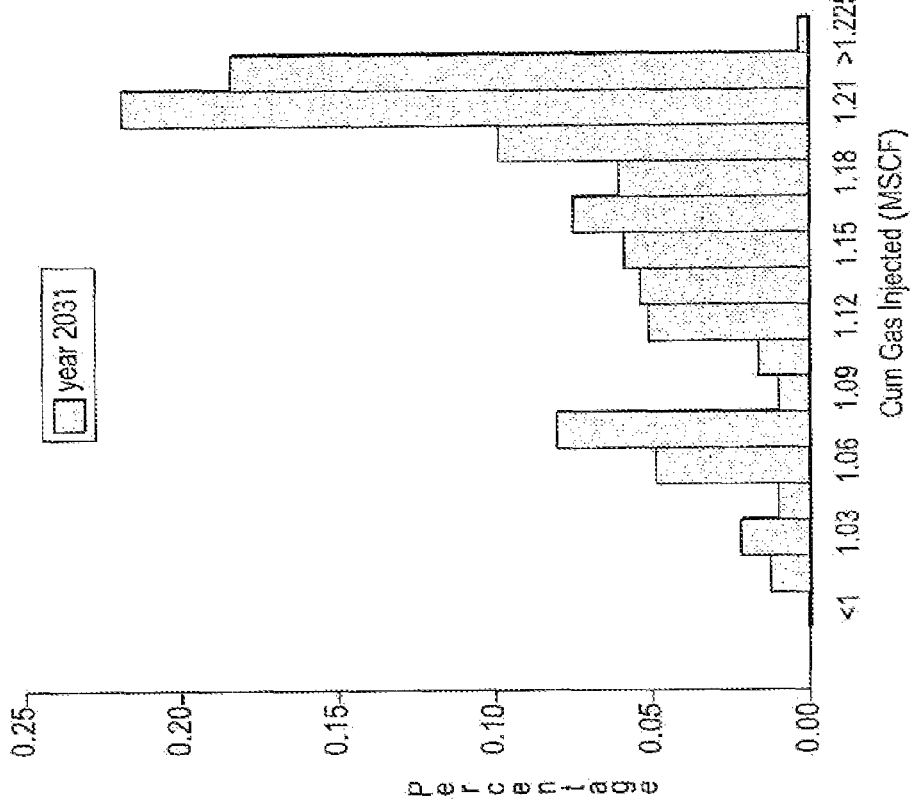
Figure 22:
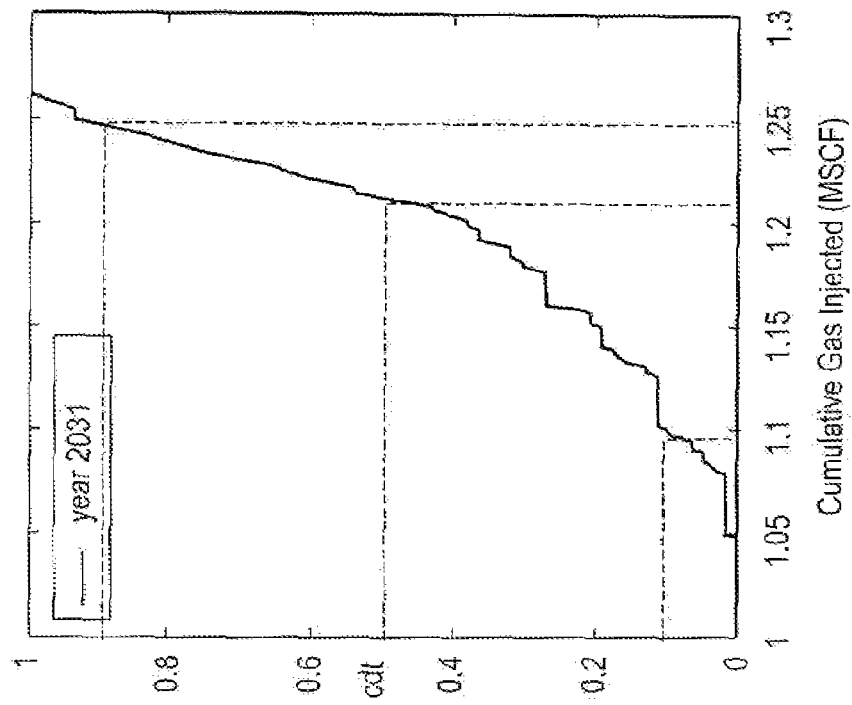
FIGS. 21 and 22 illustrate a graph showing the cumulative gas injection in the year 2031 forecasted by the 63 good models and the computer simulator in an analysis of an oil field utilizing one embodiment of the present invention.
Figure 21:
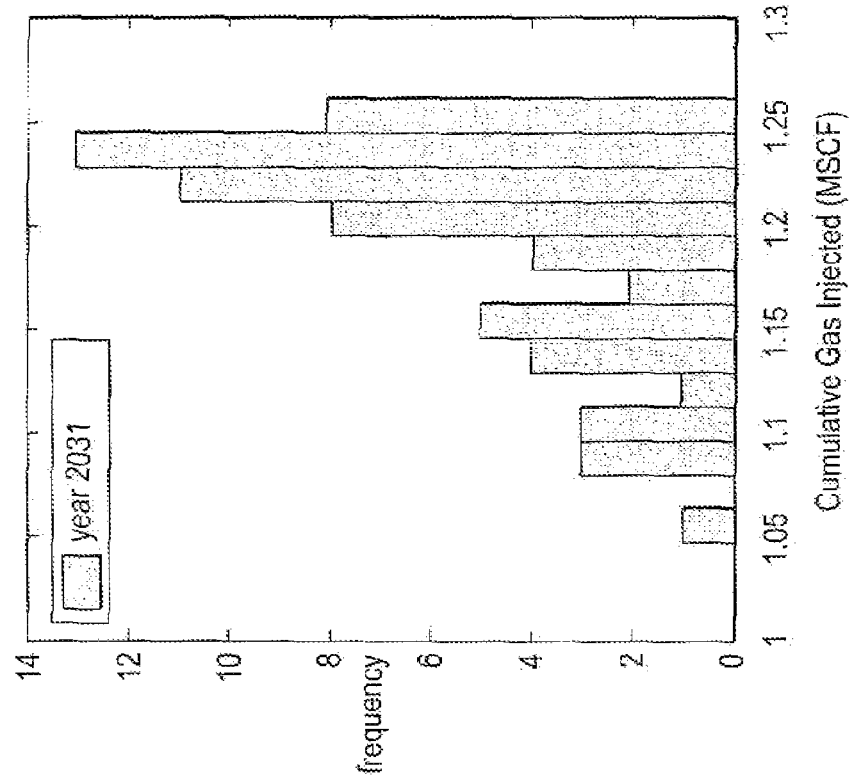

FIGS. 19 and 20 provide the cumulative gas injection for the year 2031 which was forecasted by the models. As shown, the gas injection range between 1.19 million standard cubic feet (MSCF) and 1.2 MSCF is predicated by the largest number of reservoir models (22% of the total models). This is similar to the predictions by the 63 computer simulation models a illustrated in FIGS. 21 and 22.

The cumulative density function (CDF) of the forecast proxy gave a P10 value of 1.06, a P50 value of 1.18 and a P90 value of 1.216 MSCF. This meant that the most likely (P50) injection volume would be 1.18 MSCF. There was a 90% probability that the injection would be higher than 1.05 MSCF (P10) and a 10% probability that the injection would be lower than 1.216 MSCF (P90). This uncertainty range allows for better management in preparing for gas transportation and plan for other related arrangements.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A computerized method of forecasting production profiles for petroleum reservoirs comprising the steps of:
    (a) utilizing genetic programming to generate a historical proxy and a forecasting proxy;
    (b) qualifying each of a plurality of reservoir models with the historical proxy as either a set of acceptable models or a set of unacceptable models, each model of the plurality of reservoir models having different parameter values; and
    (c) applying the forecasting proxy to the set of acceptable reservoir models to produce a range of production forecasts for the set of acceptable reservoir models.

2. The method of claim 1 which includes producing the plurality of reservoir models utilizing a uniform sampling methodology that generates a sampling distribution of a parameter space for a predetermined number of runs.

3. The method of claim 1 which further includes identifying common characteristics of the reservoir models in the set of acceptable reservoir models.

4. The method of claim 1 which further includes identifying common characteristics of the reservoir models which were not included in the set of acceptable reservoir models.

5. A computerized method of forecasting production profiles for petroleum reservoirs comprising the steps of:
    (a) producing an initial sample of reservoir models;
    (b) generating a historical production profile and a future production profile for each of the initial sample of reservoir models;
    (c) qualifying each of the initial sample of reservoir models as either acceptable or unacceptable with respect to the historical production profiles to produce a historical set of qualifications;
    (d) inputting the historical set of qualifications into genetic programming to generate a historical proxy;
    (e) applying the historical proxy to a plurality of reservoir models, the plurality of reservoir models being larger than the initial sample of reservoir models, and qualifying each model in the plurality of reservoir models as either acceptable or unacceptable to identify a set of acceptable reservoir models;

(f) quantifying each of the initial sample of reservoir models with respect to the future production profiles to produce forecasting characterizations;

(g) inputting the forecasting characterizations into genetic programming to generate a forecasting proxy; and (h) applying the forecasting proxy to the set of acceptable reservoir models to produce a range of production forecasts for the set of acceptable reservoir models.

6. The method of claim 5, wherein the initial sample of reservoir models is produced by a uniform sampling methodology that generates a sampling distribution of a parameter space for a predetermined number of runs.

7. The method of claim 1, wherein the initial sample of reservoir models is a subset of the plurality of reservoir models.

8. The method of claim 1 which further includes classifying the reservoir models in the set of acceptable reservoir models.

9. The method of claim 1 which further includes identifying common characteristics of the reservoir models in the set of acceptable reservoir models.

10. The method of claim 1 which further includes identifying common characteristics of the reservoir models which were not included in the set of acceptable reservoir models.

11. The method of claim 1 which further includes performing an outlier study utilizing the genetic programming on the initial sample of reservoir models.

12. A system for forecasting production profiles for petroleum reservoirs, including:

a historical proxy generated by a genetic program, the historical proxy qualifying a plurality of reservoir models as either acceptable or unacceptable; and a forecasting proxy generated by the genetic program, the forecasting proxy being applied to the acceptable reservoir models to produce a range of production forecasts.

* * * * *